US011684057B2

(12) United States Patent
Ali et al.

(10) Patent No.: US 11,684,057 B2
(45) Date of Patent: Jun. 27, 2023

(54) INSECT LIGHT TRAP (71) Applicant: RENTOKIL INITIAL 1927 PLC, Camberley (GB)

(72) Inventors: Wajid Ali, Finchampstead Wokingham (GB); Gary Heaton, Leyland (GB); Michael Best, Totton Southampton (GB); Gary Wingett, Totton Southampton (GB)

(73) Assignee: RENTOKIL INITIAL 1927 PLC, Blackwater (GB)

( * ) Notice: Subject to any disclaimer, the term of this patent is extended or adjusted under 35 U.S.C. 154(b) by 537 days.

(21) Appl. No.: 16/185,646

(22) Filed: Nov. 9, 2018

(65) Prior Publication Data
US 2019/0075776 A1   Mar. 14, 2019

Related U.S. Application Data (63) Continuation of application No. PCT/GB2017/053489, filed on Nov. 21, 2017.

(30) Foreign Application Priority Data

Nov. 21, 2016  (GB) ..................... 1619677

(51) Int. Cl.
*A01M 1/14*    (2006.01)
*A01M 1/02*    (2006.01)
*A01M 1/10*    (2006.01)
*A01M 1/12*    (2006.01)

(52) U.S. Cl.
CPC ............ *A01M 1/145* (2013.01); *A01M 1/026* (2013.01); *A01M 1/106* (2013.01); *A01M 1/12* (2013.01)

(58) Field of Classification Search
CPC ........ A01M 1/145; A01M 1/106; A01M 1/12; A01M 1/14; A01M 1/16
See application file for complete search history.

(56) References Cited

U.S. PATENT DOCUMENTS 1,577,148 A * 3/1926 Pical ........................ A01M 1/14
                                                        43/115
2,873,551 A * 2/1959 Misko .................. A01M 1/2011
                                                        43/111
3,956,848 A    5/1976 Job
(Continued)

FOREIGN PATENT DOCUMENTS

CN    1925742 A * 3/2007 ............. A01M 1/02
CN  106818684 A * 6/2017 ............. A01M 1/145
(Continued)

OTHER PUBLICATIONS

International Search Report dated Feb. 1, 2018 for International Application No. PCT/GB2017/053489, filed Nov. 21, 2017.

*Primary Examiner* — Peter M Poon
*Assistant Examiner* — Morgan T Jordan
(74) *Attorney, Agent, or Firm* — Dinsmore & Shohl LLP (57) ABSTRACT An insect light trap generally including a housing, a lamp for attracting insects mounted in the housing, a first space for receiving a first insect trap, and a second space contained in the housing. The second space has received therein a module including a second insect trap. The second insect trap includes an advanceable adhesive surface for trapping the insects and a motor to advance the adhesive surface.

16 Claims, 7 Drawing Sheets

(56) References Cited

U.S. PATENT DOCUMENTS

| | | | |
|---|---|---|---|
| 4,735,358 A * | 4/1988 | Morita | A01M 1/2072 206/389 |
| 5,369,908 A * | 12/1994 | Morales | A01M 1/02 43/111 |
| 5,425,197 A * | 6/1995 | Smith | A01M 1/145 43/113 |
| 5,438,792 A * | 8/1995 | Monett | A01M 1/14 43/121 |
| 5,651,211 A | 7/1997 | Regan et al. | |
| 6,871,443 B2 * | 3/2005 | Lambert | A01M 1/145 43/113 |
| 9,578,865 B1 * | 2/2017 | Lin | A01M 1/14 |
| D825,024 S * | 8/2018 | Wingett | A01M 1/2011 D22/123 |
| 2001/0042337 A1 | 11/2001 | Lambert et al. | |
| 2002/0056223 A1 * | 5/2002 | Garretson | A01M 1/026 43/121 |
| 2002/0156584 A1 * | 10/2002 | Sullivan | A01M 1/106 702/19 |
| 2003/0154644 A1 * | 8/2003 | Lambert | A01M 1/145 43/107 |
| 2004/0065000 A1 * | 4/2004 | Lambert | A01M 1/145 43/107 |
| 2005/0166445 A1 * | 8/2005 | Lambert | A01M 1/145 43/113 |
| 2007/0124987 A1 * | 6/2007 | Brown | A01M 1/023 43/113 |
| 2007/0169401 A1 * | 7/2007 | Chyun | A01M 1/145 43/113 |
| 2009/0153659 A1 * | 6/2009 | Landwehr | A01M 1/026 348/135 |
| 2012/0005947 A1 * | 1/2012 | Studer | A01M 1/145 43/58 |
| 2012/0174470 A1 * | 7/2012 | Studer | A01M 1/145 43/113 |
| 2013/0283671 A1 | 10/2013 | Czokajlo et al. | |
| 2013/0312313 A1 * | 11/2013 | Lefkowitz | A01M 1/02 43/114 |
| 2014/0007488 A1 | 1/2014 | Calabrese | |
| 2014/0026467 A1 * | 1/2014 | Kaye | A01M 1/145 43/113 |
| 2017/0086448 A1 * | 3/2017 | Studer | A01M 1/02 |
| 2017/0112116 A1 * | 4/2017 | Ji | H04L 67/12 |
| 2019/0075776 A1 * | 3/2019 | Ali | A01M 1/12 |
| 2020/0138003 A1 * | 5/2020 | Shoemaker, Jr. | A01M 1/106 |
| 2020/0396975 A1 * | 12/2020 | Furuta | A01M 1/106 |
| 2021/0204536 A1 | 1/2021 | Freudenberg et al. | |

FOREIGN PATENT DOCUMENTS

| | | | | |
|---|---|---|---|---|
| EP | 0976323 A2 | * | 2/2000 | A01M 1/145 |
| EP | 1358797 A2 | * | 11/2003 | A01M 1/02 |
| EP | E P-1832166 A2 | * | 9/2007 | A01M 1/145 |
| EP | 3162203 A1 | * | 5/2017 | A01M 1/145 |
| GB | 2459717 A | | 11/2009 | |
| GB | 2484806 A | * | 4/2012 | A01M 1/026 |
| GB | 2486456 A | | 6/2012 | |
| KR | 20090056761 A | * | 6/2009 | A01M 1/02 |
| NL | 9302089 A | * | 7/1995 | A01M 1/02 |
| WO | 92/20224 A1 | | 11/1992 | |
| WO | WO-2005000986 A1 | * | 1/2005 | A01M 1/02 |
| WO | 2005048703 A1 | | 6/2005 | |
| WO | WO-2010098377 A1 | * | 9/2010 | A01M 1/04 |
| WO | WO-2014115246 A1 | * | 7/2014 | A01M 1/14 |
| WO | WO-2016045004 A1 | * | 3/2016 | A01M 1/04 |

* cited by examiner

(Prior Art)

INSECT LIGHT TRAP

CROSS-REFERENCE TO RELATED APPLICATIONS

This Application is a continuation of PCT International Application PCT/GB2017/053489, filed on Nov. 21, 2017, which claims priority to GB Application 1619677.6, filed on Nov. 21, 2016. The contents of the aforementioned applications are herein incorporated by reference in their entirety.

INTRODUCTION

Field

The present disclosure relates to concerns insect light traps, and more specifically to a device for trapping insects comprising an insect light trap, and a modular insect trap for attaching to the insect light trap.

Background

Insect light traps, including for instance electronic fly killers, are typically manufactured to either monitor or control an infestation. Usually, an infestation, or other area that may need control, is first monitored by placing a first "monitoring" insect light trap in a space for a period of time, and the number of insects caught is monitored. If, at the end of the time period, or indeed the end of any subsequent period of monitoring, there appears to be an infestation, then a second, separate "control" insect light trap is fitted to replace the first insect light trap. As the monitoring and control insect light traps are generally separate devices differing in terms of capacity to kill insects, it is costly to manufacture and store such a set of differing devices and to replace one with another on site.

Figure 1A:
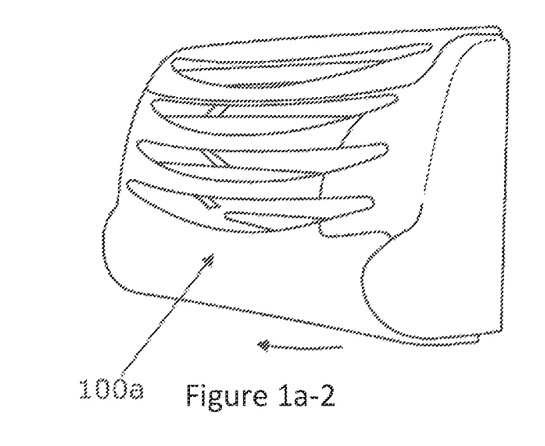
FIGS. 1a and 1b are views showing examples of known infestation monitoring and control insect light traps, respectively.
Figure 1A:
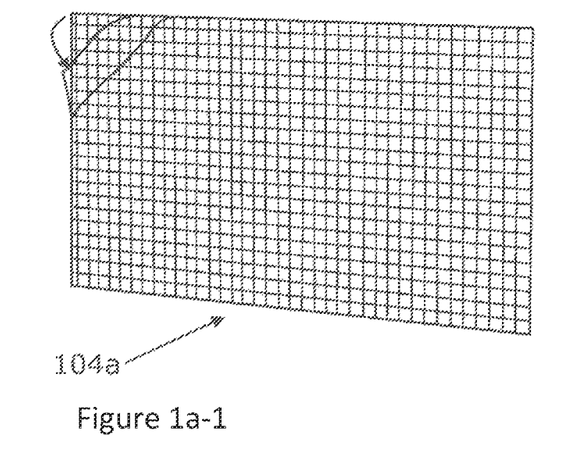
Figure 1A:
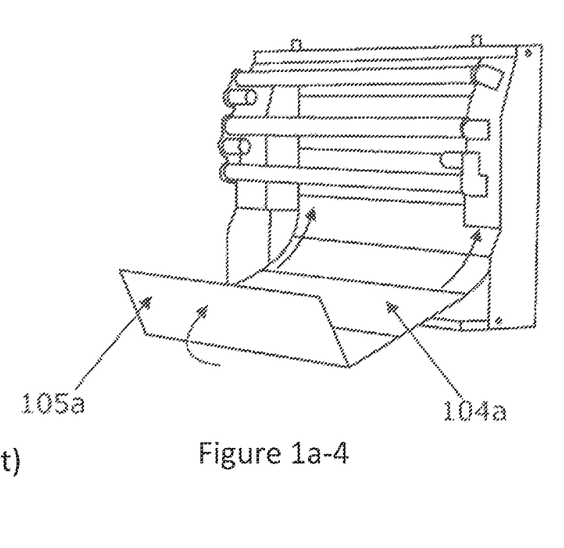
Figure 1A:
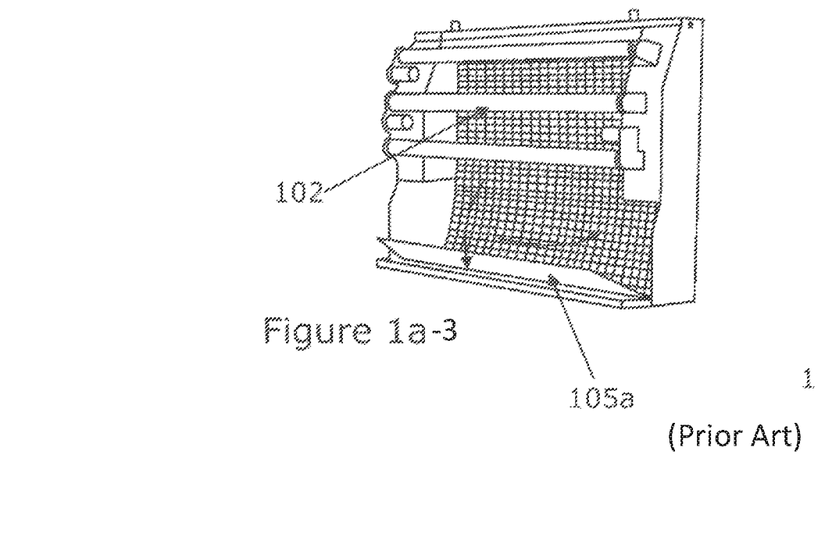
Figure 1B:
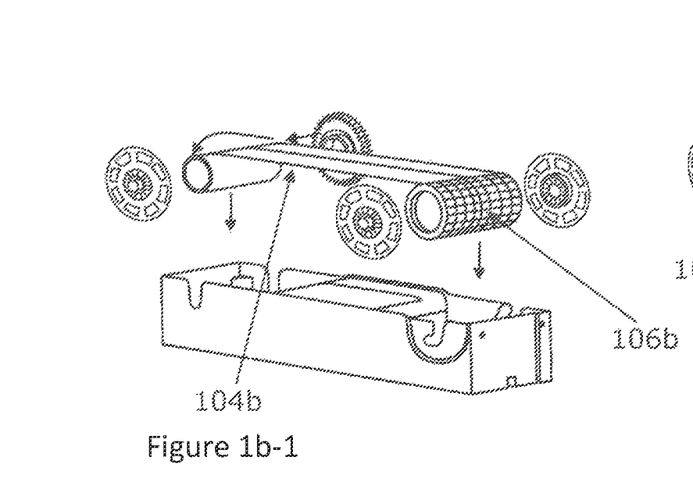
Figure 1B:
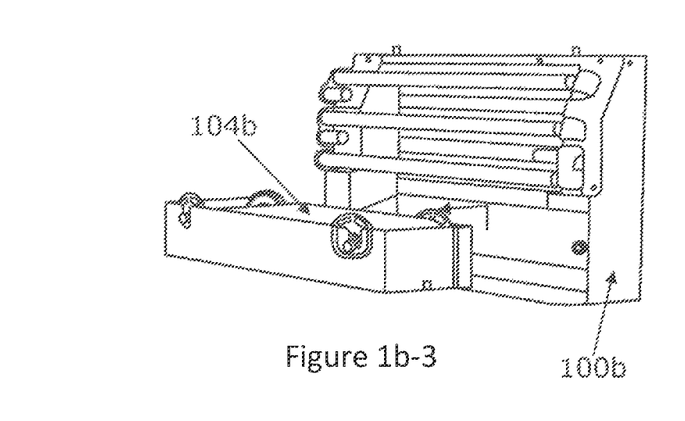
Figures 1B, 1B:
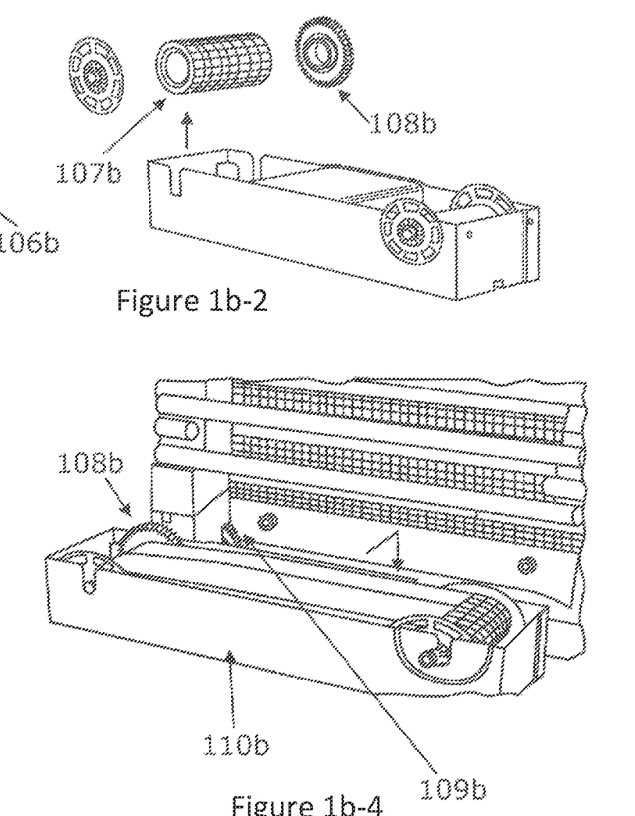

FIGS. 1a and 1b are respectively views of known insect light traps 100a and 100b. FIGS. 1a-1 through 1a-4 illustrate a plurality of views of insect light trap 100a, and FIGS. 1b-1 through 1b-4 illustrate a plurality of views of insect light trap 100b. These have a light source, for example an ultra-violet discharge tube or tubes 102, to attract insects and a glueboard 104a and 104b to trap them. Insect light trap 104b is shown only with its cover removed.

Typically, the infestation monitoring insect light trap 104a is located by a technician into position at a site for a period of time, for example six weeks. As can be seen in FIG. 1a the glueboard has a fold separating a portion 105a which, in use, lies on the floor of the trap 100a, from the other portion which rests against the back wall of the trap. At the end of the given period of time, the glueboard is removed from the infestation monitoring device and inspected, for example by counting the number of insects caught on the glueboard, to determine whether the site has an insect infestation. If it is determined that the site has an insect infestation (for example if the number of insects caught is above a predetermined threshold) then the infestation monitoring device is replaced by the infestation control insect light trap 100b, which has a greater capacity to attract and kill insects. In the example illustrated in FIG. 1b, the infestation control insect light trap 100b, has an advancing glueboard 104b, which is advanced at intervals (for example every 30 days) to ensure a fresh section of glueboard is exposed to allow continued capture of the insects during operation. In infestation control light trap 100b the advancing glueboard 104b is an adhesive tape wound around a supply roller 106b and a take-up roller 107b, with an exposed portion of the adhesive tape stretching between them. The supply and take-up rollers are mounted in an open top cartridge box 110b, the open top exposing the exposed section of the adhesive tape when the cartridge is mounted in the bottom of the trap 100b. The take-up roller has a gear 108b at one end, whose teeth are exposed though a hole (not shown) in the lower side of the box and which engage with a drive gear 109b mounted in the main part of the light trap. The drive gear is driven by a motor (not shown) also located in the main part of the light trap 100b. The motor therefore can, and is used, to drive the take-up roller, which draws the adhesive tape forward on to it from the supply roller. When the adhesive tape has run out the cartridge is replaced with a fresh one.

The present invention seeks to mitigate the above-mentioned problems. Alternatively or additionally, the present invention seeks to provide an improved insect light trap.

BRIEF SUMMARY

According to a first aspect of the invention there is provided an insect light trap for trapping insects, comprising: a housing; a lamp for attracting insects mounted in the housing; a first space for receiving a first insect trap; and a second space contained in the housing having received therein a module comprising: a second insect trap comprising an advanceable adhesive surface for trapping the insects; and a motor to advance the adhesive surface.

The first insect light trap may comprise an adhesive surface, and may be a glueboard. The first insect trap may be removable. The insect light trap may comprise the first insect trap.

The insect light trap may comprise a module in the pace and the insect light trap may be arranged to trap insects attracted by the lamp with the second insect trap.

The insect light trap may comprise an electrical connector for connecting the module, when the module is fitted, to the other part of the insect light trap.

The first aspect of the invention also provides a kit comprising a module and the other part of the insect light trap.

The first aspect of the invention further provides an insect trap module comprising: a housing for mounting the module in an insect light trap; and an insect trap comprising an advanceable adhesive surface for trapping insects; and a motor to advance the adhesive surface.

The insect trap may comprise a roll of adhesive tape.

The insect trap module may comprise guides to guide adhesive tape over at least a portion of the top side of the module exposing the adhesive of the adhesive tape. The guides that guide the adhesive tape over at least a portion of the top side of the module are rollers.

The first aspect of the invention further provides a method of monitoring and controlling an insect infestation, comprising the steps of: installing an insect light trap, having a first insect trap, at a site; monitoring the number of insects caught by the insect light trap over a period of time; and if the number of insects caught by the insect trap over the period of time is above a threshold, fitting a module having a second insect trap to the insect light trap.

The method may comprise, when fitting the module, leaving or replacing the first insect trap in the insect light trap. The method may comprise, when fitting the module, removing and not replacing the first insect trap. The method may comprise, on a subsequent occasion, removing the module from the insect light trap and replacing it with another module having an insect trap.

A second aspect of the invention provides an insect trap, comprising: a housing having a top side; and first and second guides located to pass adhesive tape between them along the top side of the housing.

The first and second guides may be located at the ends of the top side of the housing.

The insect trap may comprise a take-up roller mounted in the housing to take up the adhesive tape when it is rotated. The take up roller may be mounted to draw, as it is rotated, the adhesive tape between the first and second guides.

The first and second guides may each comprise a roller.

The insect trap may comprise a motor connected to drive rotation of the take-up roller. The insect trap may comprise a controller connected to the motor to control it to advance the adhesive tape. The controller may be arranged to operate the motor to advance the adhesive tape from time to time. The controller may be arranged to operate the motor to advance the adhesive tape periodically. The controller may be arranged to drive the motor, to advance the adhesive tape continuously.

The insect trap may comprise an electrical connector for connecting to an external electrical power source that is connected to the motor to supply that power to it.

The insect trap may comprise the adhesive tape.

The second aspect of the invention also provides a kit comprising the insect trap and the adhesive tape.

A third aspect of the invention provides an insect trap, comprising: an insect catching location arranged to pass adhesive tape there through; a take-up roller mounted to take up the adhesive tape around the roller when it is rotated; and a crushing element mounted next to the take-up roller to crush caught insects on the adhesive tape passing between the crushing element and the take-up roller.

Crushing the insects has the effect that the tape on the take up roller, with the insects being between, the layers of the tape, takes up less space than the case where the insects are not crushed.

The crushing element may be biased toward the take-up roller. The insect trap may comprise a spring providing the bias of the crushing element toward the take-up roller. The crushing element may comprise a crushing roller. The crushing element may be mounted on an arm mounted to allow movement of the crushing element toward and away from the take-up roller.

The third aspect of the invention also provides the insect trap comprising the adhesive tape.

The adhesive tape may have one adhesive side and one non-adhesive side and be mounted in the insect trap so that non-adhesive side of the adhesive tape faces the crushing element.

The third aspect of the invention also provides a kit the insect trap and the adhesive tape.

The third aspect of the invention further provides a method of trapping insects comprising: passing adhesive tape through an insect-catching location, insects thereby becoming trapped by the adhesive; taking up the adhesive tape on a take up roller; and crushing the trapped insects while on the adhesive tape.

The crushing may be by passing the adhesive tape between a crushing element and the take-up roller. The crushing element bay be biased towards the roller. A non-adhesive side of the adhesive tape contacts the crushing element.

DESCRIPTION OF THE DRAWINGS

Embodiments of the present invention will now be described by way of example only with reference to the accompanying drawings of which.

DETAILED DESCRIPTION

Figure 2A:
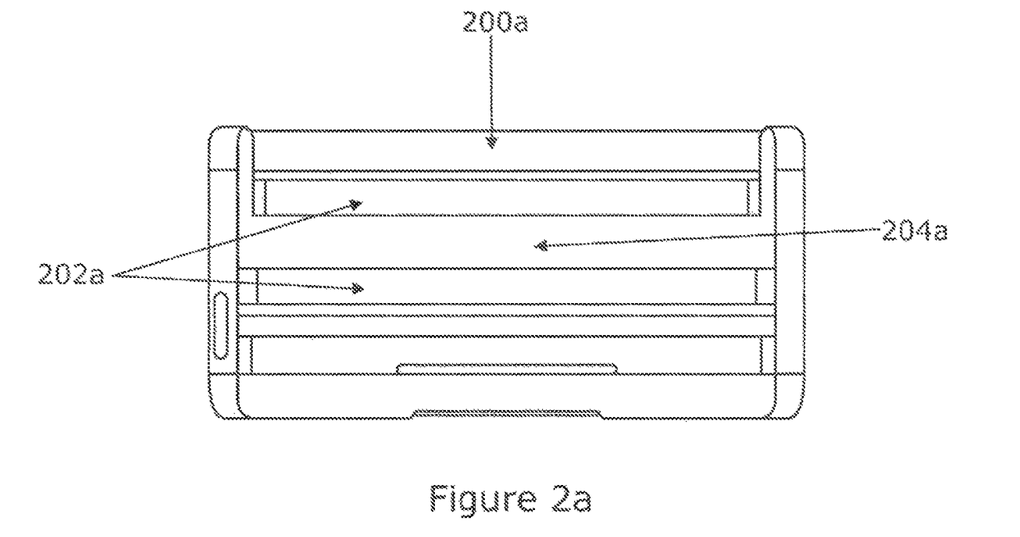
FIG. 2a shows a view of an infestation monitoring device according to an embodiment of the invention.

FIG. 2a shows a view of an insect light trap 200a according to a first embodiment of the invention, which comprises a light source 202a which, in operation, attracts insects to the monitoring device 200a. The light source may be, for example, an ultra-violet (UV) LED lamp. The monitoring trap 200a further comprises a vertical adhesive surface 204a located behind the light source 202a, and so is configured as an infestation monitoring device. In the present embodiment, the adhesive surface is a standard glueboard as known in the art, and preferably has a horizontal portion at the bottom of the device as well as a vertical portion at the back. The monitoring trap further comprises a cover with louvres 501 (not shown in FIG. 2a but visible in FIGS. 5a and 5b to house the adhesive surface 204a and the light source 202a. In operation, insects are attracted to the light source 202a, which shines through the louvres in the cover 501, some of which insects land on the adhesive surface 204a becoming stuck to the adhesive surface 204a. The infestation monitoring trap 200a may be used in the same way that known infestation monitoring devices are used—i.e. to determine whether a space has an insect infestation.

Figure 2B:
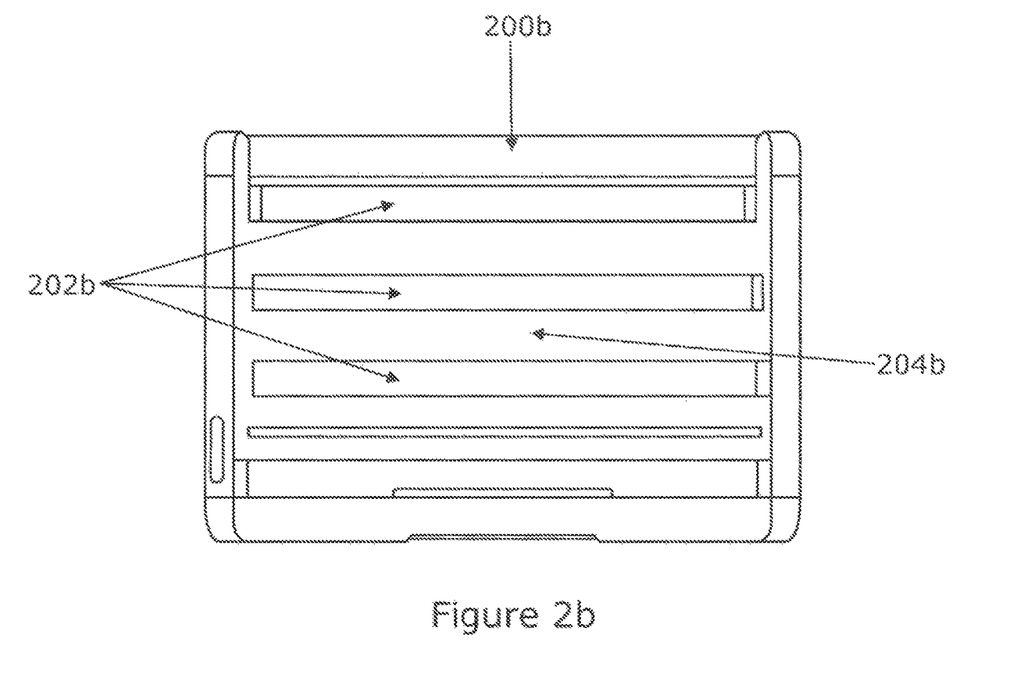
FIG. 2b shows a view of an infestation monitoring device according to an embodiment of the invention.

FIG. 2b shows a view of an insect light trap also configured as an infestation monitoring device 200b with a glueboard 204b, according to a second embodiment of the invention. Features that correspond to similar features of the first embodiment have the same reference numerals but with different suffixes. The monitoring trap 200b also comprises a cover 501 similar to the one of the first embodiment of the invention. The monitoring trap 200b differs from the monitoring trap 200a in that the height of the device is greater and that it comprises three separate light sources 202b, the greater height being to accommodate those.

Where different such monitoring traps 200 exist, a technician may choose which kind to use one depending on the site that is being monitored.

Advantageously, the monitoring trap 200, or each kind thereof 200a, 200b, is arranged to receive a modular insect trap such as those embodiments described below. Where more than one kind of monitoring trap is available is of further advantage to have those arranged to receive the same modular insect trap.

The kind of infestation monitoring device to be used at a site depends on the level of suspected infestation; for example a site with a suspected high level of infestation would benefit from a larger monitoring device such as the monitoring device 200b.

In yet other embodiments, the monitoring trap may have, for example two or more separate light sources and be of various heights. Advantageously, if it is determined that the space monitored has an insect infestation, then a modular insect trap, for example as described below, can be added to the infestation monitoring trap (rather than removing and replacing the monitoring trap with a new, complete infestation control trap). Also once the modular trap has become full it may be easily replaced with a fresh modular trap.

Figure 3A:
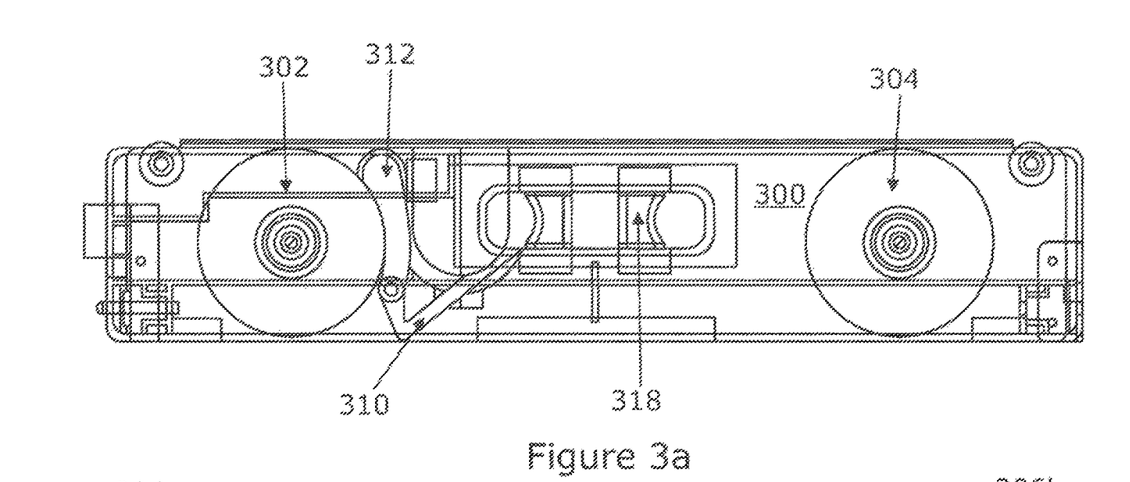
FIGS. 3a-3c show a various views of a modular insect trap according to an embodiment of the invention.
Figure 3B:
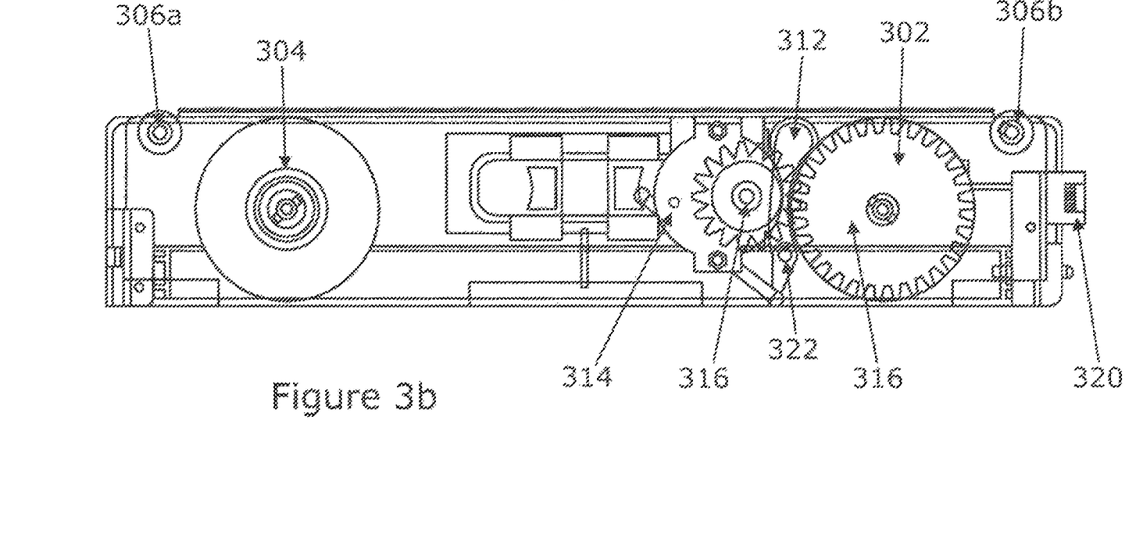

FIGS. 3a and 3b show a front view and rear view, respectively, of a modular insect trap 300 according to an embodiment of the invention. The modular insect trap 300 comprises a first roller 304 and a second, drivable roller 302. The rotation of the second roller 302 is driven by a motor 314 via a gear assembly 316, both the motor and the gear assembly being comprised in the module. In use, a roll of adhesive tape is mounted on the first roller 304 (not yet in place in FIGS. 3a and 3b). The gear assembly comprises a drive gear driven directly by the motor and a roller gear connected to axis of the second roller. The motor is an expensive part of the module, but allows the insect light trap to be easily converted from a monitoring device to an infestation controlling device, and further the basic insect light trap does not then need to be provided with a motor wastefully when it may be used many times as a monitoring device and during which period the motor could become unreliable.

Figure 3C:
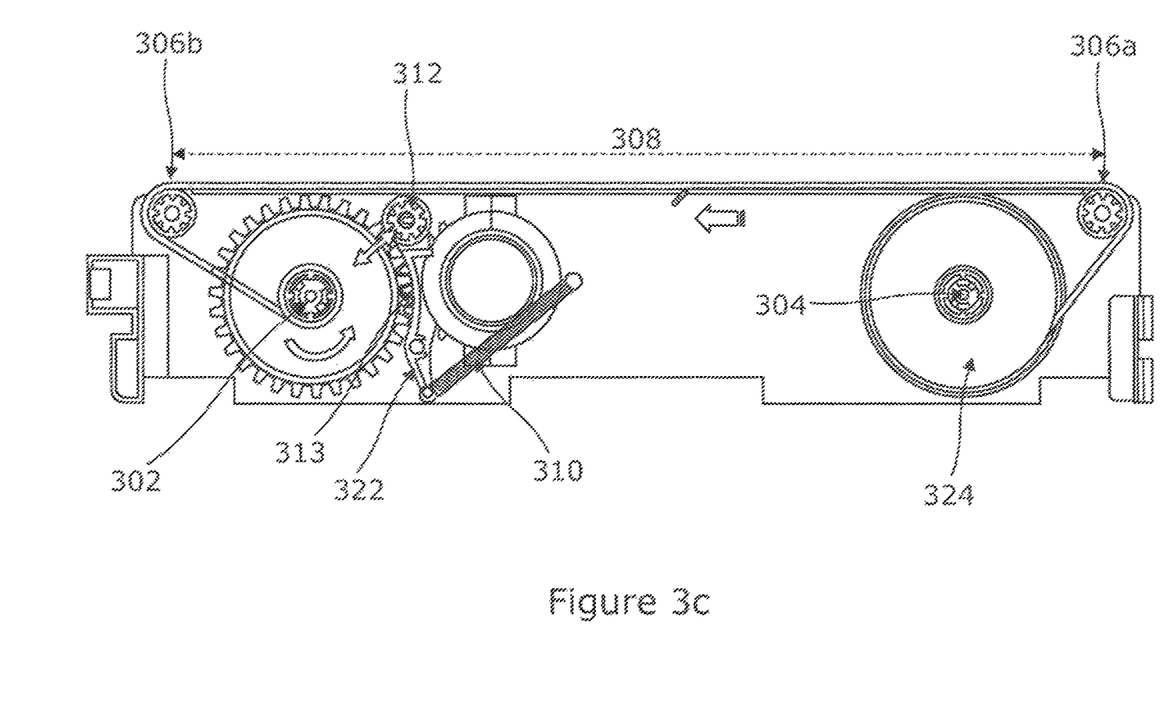

FIG. 3c shows a front view of the modular insect trap 300, with the roll of adhesive tape 324 mounted on the first roller 304. The roll of adhesive tape 324 is partially unwound, passed over two guide rollers 306a and 306b, and attached to the second roller 302 (for example by insertion of the end into a slot in the roller or by winding one or more loops of adhesive tape around the second roller 302 such that the adhesive tape sticks to itself). The rollers 306a and 306b are at the upper corners of the module 300. As the rollers 306a and 306b are at extreme ends of the module 300, this advantageously allows an exposed area of adhesive tape 308 (indicated by the dashed line) to extend along the entire top side of the module 300. This maximizes the exposed area of adhesive tape 308 for catching insects when the modular insect trap 300 is inserted into an infestation monitoring trap 200.

The modular insect trap 300 further comprises a crushing roller 312, connected to a pivot 322 via an arm. A spring 310 under tension connects to the arm on the other side of the pivot 322, so that the crushing roller 312 is biased towards contact with the second roller 302 (the biased position being indicated by the dotted outline of the crushing roller 302 in FIG. 3c). In operation, the motor 314 drives rotation of the second roller 302 to wind in adhesive tape, from the area 308 via roller 306a, which is taken up around the second roller 302. During the winding of the adhesive tape around the second roller 302, the crushing roller 312 is biased towards contact with a part of the surface of the adhesive tape. It is also provided with a crushing guide 313, which is mounted on the arm to move with the crushing roller 312. This has an arcuate surface facing the second, take up roller 302 which ends near the roller close to a tangent of the roller. This helps the tape to remain fairly straight as it approaches the roller, even if a large insect has been caught, reducing the chance of the tape tearing.

In use, when the modular insect trap 300 is installed in the insect light trap 200 as described below, the light source(s) 202 attract insects to the insect light trap, some of which land on the exposed area of adhesive tape 308 of the modular insect trap 300, and are caught. The motor 314 rotates from time to time to ensure that the exposed area of adhesive tape 308 is replenished with fresh adhesive tape. Adhesive tape which holds caught insects is wound onto the second roller 302, passing under the crushing roller 312. The crushing roller 312 compresses the caught insects, with the result that the adhesive tape winds tightly onto the second roller 302, (rather than the layer of tape being spaced apart from the layer below by uncrushed insects).

The insect light trap is provided with a controller (not shown) which provides control signals to the module to advance, exposing fresh adhesive surface. In the present embodiment an example is that it does that every 30 days. In other embodiments the signals are generated to advance the adhesive tape continuously but very slowly.

While some users may prefer to fit the insect light trap 200 in infestation control mode with a glueboard on the back plane as well as the module on the bottom, this is not needed in may situations the module having sufficient capacity to collect the insects by itself. With no glueboard on the rear all killed insects are at the bottom of the unit and none are on the backplane where they are unsightly and unhygienic.

In the present embodiment the motor 314 is electrically connected to the power supply of the monitoring trap 200 via the connector 320 when installed.

Figure 4:
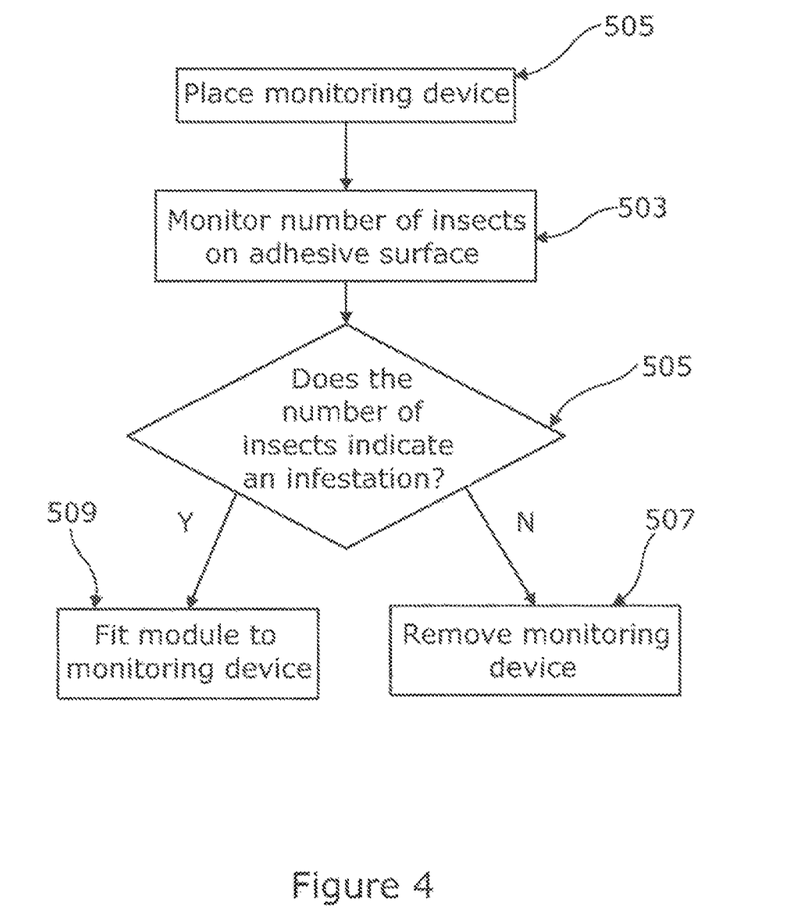
FIG. 4 shows a flowchart describing the process of fitting an infestation monitoring device with a modular insect trap according to an embodiment of the invention.

FIG. 4 shows a flowchart of the process of monitoring an insect infestation and fitting an infestation monitoring trap 200 with a modular insect trap 300, according to an embodiment of the invention. Firstly, a monitoring trap 200, without the module, is placed in a space 501 for a predetermined time period (for example, six weeks). Once the time period has elapsed, the number of insects present on the adhesive surface 204 is monitored 503, for example by a technician counting the number of insects on the adhesive surface 204. If the number of insects does not indicate an infestation 505, for example if the number of insects is below a predetermined threshold, then the monitoring trap is removed 507 and no further action is taken. If the number of insects does indicate an infestation (i.e. the number of insects is above the predetermined threshold) then the modular insect trap 300 is fitted to the monitoring trap 200 (step 509). Alternatively, the monitoring trap may be left in place for a further period of monitoring.

Figure 5A:
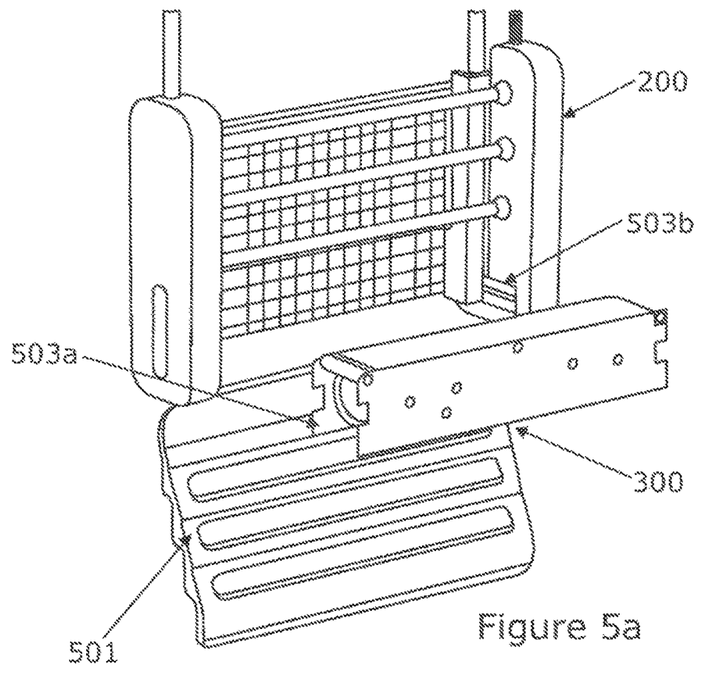
FIGS. 5a and 5b are schematic diagrams showing the fitting of an infestation monitoring device with a modular insect trap according to an embodiment of the invention.
Figure 5B:
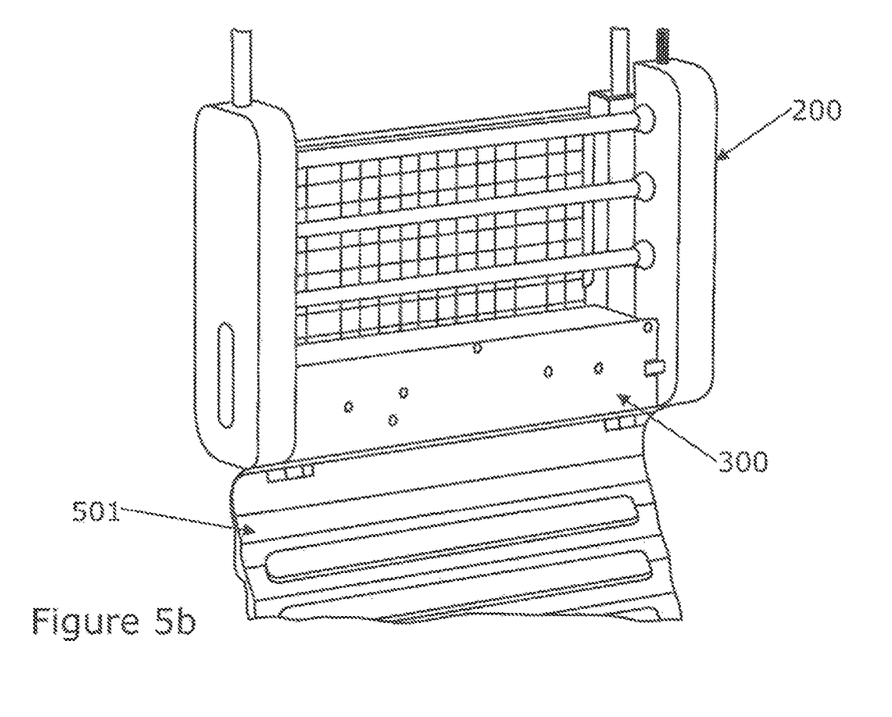

FIGS. 5a and 5b illustrate the fitting of the modular insect trap 300 to the monitoring trap 200 according to an embodiment of the invention. The cover is removed, by being hinged open as shown. The technician removes the adhesive surface 204 (e.g. a glueboard) and counts the insects. Where it is decided to fit the modular insect trap 300 (step 509), a modular insect trap 300, prepared by fitting with adhesive tape as described previously, is offered up to the monitoring insect trap 200 and grooves 503a on the modular insect trap 300 are lined up with supporting rails 503b on the monitoring device 200, and the modular insect trap is slid into position as shown in FIG. 5b. Once in position, the connector 320 of the modular insect trap 300 connects with a connector of the monitoring device (not shown). This supplies power and data connection to the product interface. The cover 501 may then be closed.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, while in some embodiments the monitoring device 200a comprises a cover 500, in other embodiments there is no cover or the cover only partially houses the adhesive surface 204a and the light source 202a. Further, while in the particular embodiments illustrated the adhesive surface for example a standard glueboard as known in the art, in other embodiments any other adhesive surface or other device for catching insects maybe used.

Further, whilst in the described embodiment the crushing roller 312 is biased towards contact with the second roller 302 using a spring in tension on the opposite side of a pivot, in other embodiments the spring is on the same side of the pivot to the crushing roller 312. In yet further embodiments the crushing roller 312 is biased using other biasing means, for example an arm made of flexible material which is under bending such that the crushing roller 312 is biased towards the second roller 302.

Whilst in the described embodiments the modular insect trap 300 is supported by the monitoring trap 200 via a groove and shelf arrangement 503a, 503b, in other embodiments the modular insect trap 300 is supported by other means. For example, in some embodiments the insect trap 300 rests on a platform of the monitoring device 200.

What is claimed is:

1. An insect light trap for trapping insects, comprising:
   a housing,
   a lamp for attracting insects mounted in the housing,
   a first space contained in the housing having received therein a first insect trap, wherein the first insect trap comprises a trap for monitoring a number of insects caught over time;
   a first connector configured for electrically connecting the insect light trap to a module, when the module is received in a second space contained in the housing; and
   the second space contained in the housing, the second space having received therein the module consisting of:
   a second insect trap with an advanceable adhesive surface for trapping the insects;
   a first roller;
   a second roller;
   a motor contained in the module and configured to advance the advanceable adhesive surface by rotating about the second roller;
   a crushing element configured to crush the insects on the advanceable adhesive surface; and
   a second connector configured for electrically connecting the module to the first connector of the insect light trap and supplying power to the motor contained in the module.

2. The insect light trap of claim 1, wherein the first insect trap comprises an adhesive surface.

3. The insect light trap of claim 2, wherein the first insect trap is a glueboard.

4. The insect light trap of claim 1, wherein the first insect trap is removable.

5. The insect light trap of claim 1, wherein the crushing element is configured to crush the insects on the advanceable adhesive surface by crushing the insects between the crushing element and the second roller.

6. The insect light trap of claim 1, wherein the crushing element is biased towards contact with the second roller.

7. The insect light trap of claim 1, wherein the advanceable adhesive surface comprises a roll of adhesive tape.

8. An insect trap module consisting of:
   a housing for mounting the insect trap module in an insect light trap;
   an insect trap, contained in the housing, with an advanceable adhesive surface for trapping insects;
   a first roller;
   a second roller;
   a motor, contained in the housing, configured to advance the advanceable adhesive surface by rotating about the second roller;
   a crushing element configured to crush insects on the advanceable adhesive surface; and
   a first connector configured for electrically connecting the module to a first connector of the insect light trap and supplying power to the motor contained in the module when the module is fitted to the inset light trap.

9. The insect trap module according to claim 8, wherein the advanceable adhesive surface comprises a roll of adhesive tape.

10. The insect trap module of claim 8, wherein the crushing element is configured to crush the insects on the advanceable adhesive surface by crushing the insects between the crushing element and the second roller.

11. The insect trap module of claim 8, wherein the crushing element is biased towards contact with the second roller.

12. A method of monitoring and controlling an insect infestation, comprising:
   installing an insect light trap at a site, wherein the insect light trap comprises:
   a housing,
   a lamp for attracting insects mounted in the housing,
   a first insect trap;
   a space contained in the housing for receiving a module;
   a first connector configured for electrically connecting the insect light trap to the module when the module is received in the space contained in the housing;
   monitoring a number of insects caught by the first insect trap over a period of time; and
   fitting the module to the insect light trap, the module consisting of:
   a second insect trap with an advanceable adhesive surface for trapping the insects; a first roller;
   a second roller;
   a motor contained in the module and configured to advance the advanceable adhesive surface by rotating about the second roller;
   a crushing element configured to crush the insects on the advanceable adhesive surface; and
   a second connector configured for electrically connecting the module to the first connector of the insect light trap and supplying power to the motor contained in the module.

13. The method of claim 12, further comprising, when fitting the module, replacing the first insect trap in the insect light trap with a new first insect trap.

14. The method of claim 12, further comprising, when fitting the module, removing the first insect trap.

15. The method of claim 13, further comprising, on a subsequent occasion, removing the module from the insect light trap and replacing the module with a second module.

16. The method of claim 15, wherein the second module comprises:
   a third insect trap comprising a second advanceable adhesive surface;
   a third roller;
   a fourth roller;
   a second motor contained in the second module and configured to advance the second advanceable adhesive surface by rotating about the fourth roller;
   a second crushing element configured to crush the insects on the advanceable adhesive surface; and third connector configured for electrically connecting the second module to the first connector of the insect light trap and supplying power to the second motor contained in the second module.

* * * * *